3,322,895

TELEVISION RECEIVER CIRCUIT FOR STABILIZING BLACK LEVEL AND LIMITING CRT BEAM CURRENT

Bernard D. Loughlin, Huntington, N.Y., assignor to Hazeltine Research Inc., a corporation of Illinois
Filed Sept. 18, 1963, Ser. No. 309,773
7 Claims. (Cl. 178—7.5)

The present invention relates to picture control apparatus for a television receiver utilizing either a direct-current (D.-C.) coupling or direct-current restorer arrangement between the video output stage and the cathode-ray type image display device. More particularly, it relates to apparatus useful in such a receiver for limiting the amount of beam current flowing in the cathode-ray tube to prevent high voltage power supply overload and to reduce any annoying subjective effects that may be produced upon the viewer due to changes in the average brightness value of the transmitted scene.

High voltage power supply overload is not normally a problem in image-reproducing systems employing an alternating-curent (A.-C.) coupling between the video output stage and the cathode-ray type image-reproducing device. Such coupling enables the average value of picture tube beam current to remain fairly constant at a level at which the current capability of the high voltage power supply is not exceeded, regardless of the average brightness value of the image signal. In addition, the amount of light radiated from the face of the picture tube does not vary substantially as the average brightness value of the transmitted scene changes. But, A.-C. coupling proves unsatisfactory if scenes of different average brightness value are to have their proper shade value in the reproduced image.

On the other hand, the use of a D.-C. coupling or D.-C. restorer arrangement stabilizes black in the reproduced image so that accurate signal reproduction results. However, the use of such a scheme permits the picture tube beam curent to vary drastically, to the extent that it may reach a value on the occasional scene of high average brightness sufficient to overload the high voltage power supply. Such overloading often results in substantial changes in the width to height ratio of the picture dimensions and in pronounced defocusing effects. To prevent these overload effects, the viewer may turn down the contrast control, but this reduces the average brightness of the reproduced image on all scenes. Even if the television receiver were designed with scanning circuit power capability sufficient to eliminate overload effects, the variations in the light radiated by the picture tube, due to the variations in beam current flowing therein, might prove objectionable to the viewer. This would be so if low average brightness scenes followed high average brightness scenes, and vice versa, especially if ambient lighting conditions were poor.

For the purpose of the specification and the appended claims it will be understood that: video signals representing scenes of low average brightness value have a large distribution of signal levels near black; video signals representing scenes of medium average brightness value have an average distribution of signal levels equal to a level approximately midway between black and white; and video signals representing scenes of high average brightness value have a large distribution of signal levels near white.

It is an object of the present invention to provide picture control apparatus in a television receiver that limits the amount of beam current flowing in the image-reproducing device thereof to reduce any annoying subjective effects that may be produced upon the viewer due to changes in scene brightness.

It is another object of the present invention to provide picture control apparatus having the characteristic set forth above and which additionally maintains correct black level operation in the reproduced image.

It is a further object of the present invention to provide picture control apparatus having the characteristic set forth in the first object above and which additionally prevents high voltage power supply overload.

It is yet a further object of the present invention to provide picture control apparatus having the characteristics set forth in the third object above and which additionally maintains correct black level operation in the reproduced image.

In accordance with the present invention a television receiver having a cathode-ray tube and an energy supply connected thereto for purposes of image reproduction, picture control apparatus comprises means for supplying a video signal having a blanking level which may vary with changes in received signal intensity, having a D.-C. component representative of average scene brightness which may vary from scene to scene, the supply means including control means for varying the magnitude of the video signal, means for translating the supplied video signal to an input of the cathode-ray tube, wherein the translation causes the blanking level of the translated video signal to undesirably vary at the input with changes in average scene brightness, in addition to varying with changes in received signal intensity, a keyed automatic-gain-control circuit coupled to the input of the cathode-ray tube and responsive to the blanking level of the translated video signal for developing an output signal jointly representative of variations in received signal intensity and of variations in average scene brightness and means for coupling the output signal to the control means for varying the magnitude of the supplied video signal to limit the amount of beam current flowing in the cathode-ray tube on scenes of high average brightness and to stabilize blanking level at the input of the cathode-ray tube, thereby maintaining black level constant in the reproduced image.

For a better understanding of the present invention together with other and further objects thereof, reference is had to the following description taken in connection with the accompanying drawings, and its scope will be pointed out in the appended claims.

Referring to the drawings:

FIG. 1 is a circuit diagram, partly schematic, of a television receiver including apparatus constructed in accordance with a particular form of the present invention;

FIGS. 2*a*–2*d* are signal diagrams utilized in describing the operation of the apparatus shown in FIG. 1;

FIG. 3 illustrates a modified form of apparatus in accordance with the invention;

FIGS. 4*a*–4*d* are signal diagrams employed in explaining the operation of the FIG. 3 apparatus;

Figures 1, 2:
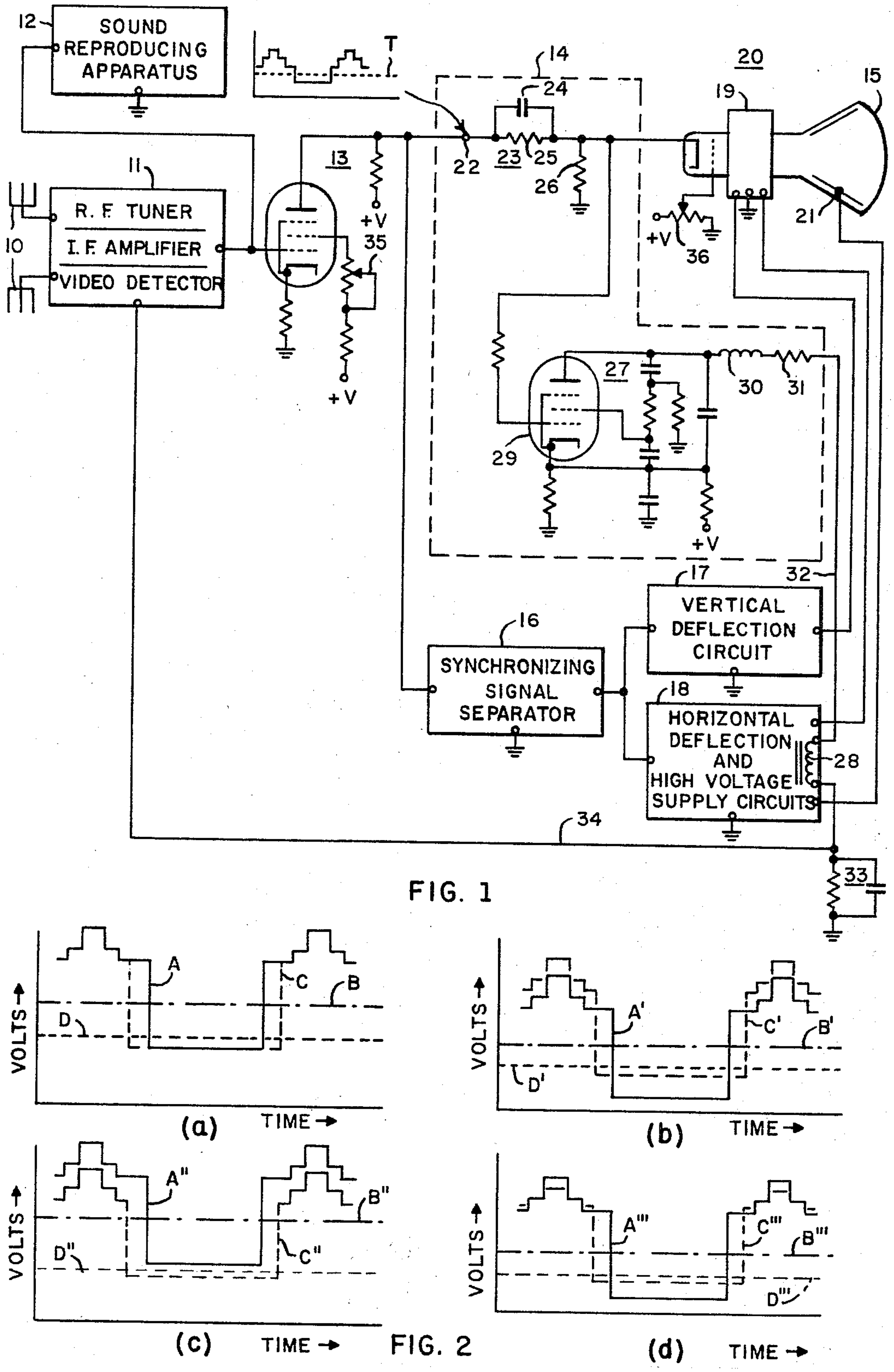

*Description and operation of the television receiver of FIG. 1*

Referring to FIG. 1, there is shown a television receiver including apparatus constructed in accordance with a particular ticular form of the present invention. Unless otherwise noted, the receiver may be of conventional construction. Thus, the receiver comprises, in part, antenna system 10 coupled to the input of unit 11 which includes the usual radio-frequency (RF) tuner, intermediate-frequency (IF) amplifier, and video detector from which are derived a sound modulated intercarrier beat note component and a video signal component. The sound component is applied to sound reproducing apparatus 12 wherein it is amplified, detected, and reproduced by the sound reproducing device.

The video signal component is D.-C. coupled from the video detector in unit 11, with sync peaks extending in a negative direction, to the control grid of video amplifier 13 wherein it is amplified, reversed in polarity and applied through picture control apparatus 14 to a cathode-ray type image display device or picture tube 15 in a manner to be subsequently described. The video signal developed by amplifier 13 is also applied to synchronizing signal separator 16 wherein the synchronizing pulses in the composite signal are stripped and applied to the vertical and horizontal deflection circuits 17 and 18. Beam deflection signals are generated in these units and applied to the deflecting yoke 19 of image-reproducing apparatus 20 for controlling beam deflection in the usual manner. Unit 18 additionally includes a high voltage power or energy supply which provides the operating potential required by the high voltage anode 21 of picture tube 15. As will be subsequently described, apparatus 14 as embodied in FIG. 1, operates to limit the amount of beam current flowing in picture tube 15 and, thereby, to prevent power supply overload, by reducing the magnitude of the supplied video signal as the average brightness value of the transmitted scene increases. In addition, apparatus 14 operates in such a manner as to maintain correct black level operation in the reproduced image irrespective of the magnitude of the supplied video signal.

Although apparatus 14 additionally operates to reduce any annoying subjective effects that may be produced upon the viewer due to changes in scene brightness, the discussion relating to its description will be limited to the feature of overload protection and black level stabilization. This is not to be construed as a belittling of the subjective impression feature of the invention but as a means of simplifying the discussion that follows. It is to be understood that in limiting the amount of beam current flowing in the picture tube 15, in a manner to be subsequently described, the reproduced image is prevented from becoming excessively bright so that changes in scene brightness, as from a low brightness scene to a high brightness scene, do not prove objectionable to the viewer. This concept is to be carried throughout the description relating to apparatus 14 as well as to the other forms of the invention described though no mention of it is made. Furthermore, it is to be understood that the subjective impression feature applies even if the high voltage power supply located in unit 18 is not susceptible to overload.

*Description and operation of picture control apparatus 14 of FIG. 1*

Referring now more particularly to the picture control apparatus 14 which embodies one form of the present invention, the arrangement there represented includes means for supplying a video signal having an average value which may vary from scene to scene. Such means may include that portion of the television receiver immediately to the left of apparatus 14, i.e., may include antenna 10, unit 11, and video amplifier 13. For ease of discussion, the signal supply means will hereinafter be referred to as input terminal 22. Also included in the signal supply means is means for controlling or varying the magnitude of the supplied video signal. Specifically, this control means takes the form of a plurality of variable grid-to-cathode biases located in the amplifier stages of unit 11 to maintain the signal developed by amplifier 13 within a narrow range of intensities for a wide range of received signal intensities.

Control apparatus 14 also includes means, such as network 23 for coupling the supplied video signal to the picture tube 15. Network 23 specifically includes a first path, including capacitor 24, adapted to translate the A.-C. components of the supplied signal to picture tube 15, and a second path, including voltage divider resistors 25 and 26, adapted to translate a portion of the D.-C. component. As will become clear hereinafter, this unequal translation of the A.-C. and D.-C. components causes the blanking level of the video signal on the picture tube side of network 23, i.e., at the cathode of picture tube 15, to vary as scene brightness changes. Since the blanking level differs from the black level by a small fixed amount ("set up"), and therefore since the black level varies in a corresponding manner, these variations cause the black level reference in the reproduced image to vary so that accurate signal reproduction is impaired thereby.

Control apparatus 14 additionally includes means responsive to the undesired variations in the blanking level on the picture tube side of network 23 for deriving a signal representative of the variations of the D.-C. component or average brightness value of the supplied video signal. As shown in FIG. 1, such means includes the keyed rectifier circuit 27 from which an automatic-gain-control (AGC) effect is derived. Any one of a number of back porch keyed AGC circuits may be used such as those described in application Ser. No. 223,494, filed Sept. 13, 1962, and entitled "Control Apparatus for a Television Receiver" which issued Jan. 25, 1966 as Patent No. 3,231,669. Specifically, circuit 27 is identical to one fully described in application Ser. No. 223,494 in which positive flyback pulses derived from transformer 28 of the horizontal sweep output circuit of unit 18 are employed to key AGC tube 29 into plate current conduction during the time at which the back porch portion of the video signal is present at its control grid. In this manner, an AGC control effect is derived from the blanking level of the video signal.

Control apparatus 14 further includes means for coupling the derived AGC signal to the aforementioned video gain control means located in unit 11 for varying the magnitude of the supplied video signal to limit the amount of beam current flowing in picture tube 15 to prevent overload of the high voltage power supply on scenes having a high average brightness value and to maintain black level constant in the reproduced image. Such means includes the series circuit consisting of inductor 30, resistor 31, wire 32, transformer 28, network 33, and wire 34. The derived signal furthermore, is applied to the control means in such a manner that the magnitude of the supplied video signal is varied in a direction opposite to variations in scene brightness.

It would be instructive to consider at this point the operation of apparatus 14 for the case where the invention is not operative. This would be the case if, for example, AGC circuit 27 were of the more conventional sync tip variety and the input to the AGC tube 29 were coupled to terminal 22. In this discussion it will be understood that resistor 26 is of a relatively low value so that the picture tube beam current flowing through it will not substantially affect the signal waveforms at the picture tube side of network 23. It will also be understood that the D.-C. degeneration caused by the picture tube cathode current is negligible.

Thus, the video signal developed by amplifier 13 and supplied to input terminal 22 may be shown by the waveform above terminal 22 where T represents the D.-C. component or average value of the signal. As scene content changes, the A.-C. and D.-C. components of this signal also change, representing variations in instantaneous picture brightness and average picture brightness respectively. However the amplitude of the synchronizing pulse peaks and the amplitude of the blanking level from which they extend, each measured with respect to ground, remain constant as they are fixed at the television transmitter in accordance with Federal Communications Commission regulations, as long as the contrast control 35 located in the screen grid circuit of amplifier 13 is maintained at a constant setting.

FIG. 2*a* of the drawings more clearly represents a small portion of this video signal at terminal 22. Specifically, in FIG. 2*a*, waveform A, having a D.-C. component B, represents a medium average brightness scene, whereas waveform C, having a D.-C. component D, represents a high average brightness scene. For the sake of clarity, the waveform representing a low average brightness scene has been purposely omitted.

FIG. 2*b* shows the effect translation through coupling network 23 has upon the video signal as it appears at the cathode of picture tube 15. It will be noted therefrom that the magnitude of the A.-C. components of waveform A′ and C′, the translated counterparts of waveforms A and C, respectively, remain unchanged after translation. However, D.-C. components B and D are each proportionately reduced to B′ and D′ by an amount determined by the relative value of resistors 25 and 26.

The arrangement thus far described is similar to the commonly used approach to the D.-C. restoration problem, that of partial D.-C. coupling. However, with that approach, black is accurately reproduced only for one intermediate range of average brightness values. This will be more fully described below.

Since the A.-C. and D.-C. components of the video signal are not translated to picture tube 15 in equal amounts, the correlation that had existed between blanking level and sync tips on the video amplifier side of network 23 does not exist on the picture tube side of network 23. That is, whereas the blanking level and sync tip amplitude are constant for all scenes at input terminal 22, the respective amplitudes vary at the cathode of picture tube 15, as shown in FIG. 2*b*. If brightness control 36 located in the control grid circuit of picture tube 15 were adjusted so that the black level of the medium average brightness scene A′ just reaches black in the reproduced image, then the black level of the translated high average brightness scene C′ would be suppressed. Conversely, if brightness control 36 were adjusted so that the black level of the translated high average brightness scene C′ just reaches black in the reproduced image, then the black level of the translated medium average brightness scene A′ would be reproduced as a shade of grey. It is readily apparent from a comparison of FIGS. 2*a* and 2*b* that for a given voltage divider ratio $R_{26}/R_{25}+R_{26}$, the amount of undesired blanking level variations is related to, and dependent upon, the D.-C. component of the supplied video signal. It will now be described how the present invention detects these blanking level variations and employs them to prevent high voltage power supply overload and to stabilize black in the reproduced image.

As can be seen from FIG. 2*b*, if the transmitted scene changes from one of medium average brightness to one of high average brightness, the blanking level at the picture tube side of network 23 increases. This causes an increase in the blanking leves at the grid of the AGC tube 29 and a corresponding increase in the AGC signal developed, which is then applied to the control grids of the vacuum tubes in the amplifier stages of unit 11 to increase the bias thereon so that the magnitude of the video signal supplied at terminal 22 is decreased. More particularly, both the A.-C. and D.-C. components of the supplied signal are decreased. This is more clearly shown in FIG. 2*c* where C″ represents the high average brightness signal developed at terminal 22 with the invention operative and where D″ represents its D.-C. component.

The decrease in the D.-C. component, together with the decrease in the A.-C. component, causes the blanking levels associated with both the medium and high average brightness scenes to line up at the same level of amplitude at the picture tube side of network 23 so that the black level will be reproduced as very nearly black for each scene. (See FIG. 2*d* where C‴ represents the translated counterpart of signal C″ and where A‴ represents the translated counterpart of the medium average brightness scene A″ shown in FIG. 2*c*.) With blanking level stabilized thus, the decrease in the A.-C. component in the supplied signal causes a corresponding decrease in the A.-C. component at the cathode of picture tube 15. As a result the average picture tube beam current decreases and the possibility of power supply overload is reduced accordingly.

If the transmitted scenes changes from one of medium average brightness to one of low average brightness, the AGC signal developed by tube 29 decreases, thereby increasing the magnitude of the supplied video signal and, more particularly, increasing the A.-C. and D.-C. components of the supplied signal. No overload compensation is necessary on such low average brightness scenes but the combined effect of the increase in A.-C. and D.-C. components again causes the blanking level associated with each transmitted scene to coincide at the cathode of picture tube 15 so that black will be maintained very nearly constant in the reproduced image.

The arrangement just described is one which detects conditions which may cause overload to occur and then provides the necessary corrections to prevent its occurrence, rather than one which permits overload to occur before providing the necessary compensation to prevent its continuance.

Figure 3:
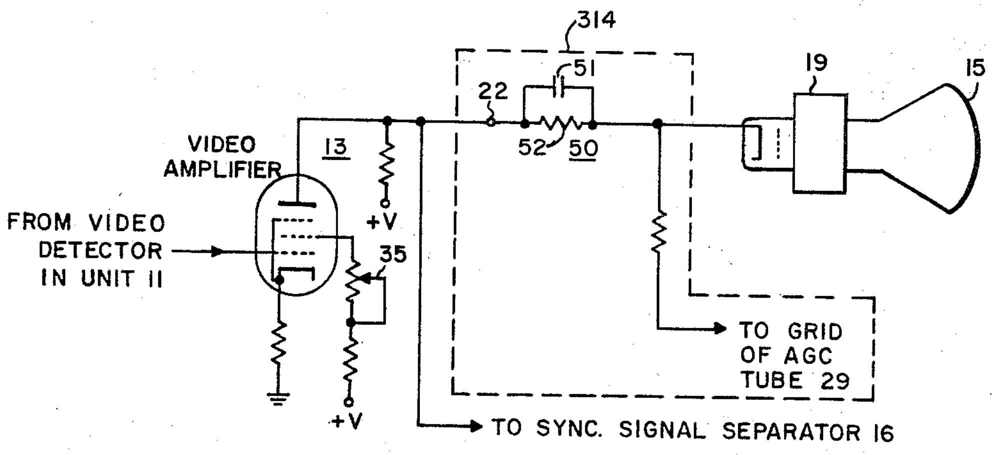

*Picture control apparatus 314 of FIG. 3*

The embodiment just described protects against power supply overload on high average brightness scenes while maintaining black level constant in the reproduced image by varying the magnitude of the supplied video signal to limit the amount of beam current flowing in picture tube 15 on such scenes. As such, the operation is observed to be voltage sensitive, i.e., independent of the beam current flowing in picture tube 15. It is possible, however, to achieve the same degree of overload protection and black level stabilization by using an arrangement which is current sensitive, i.e., an arrangement in which the magnitude of the video signal is varied in response to variations in picture tube beam current.

Thus, there is shown in FIG. 3 a modified form of picture control apparatus 314 constructed in accordance with the invention and which is quite similar to the picture control apparatus 14 of FIG. 1, the only difference between the two being the manner in which the supplied video signal is coupled to the picture tube 15. In FIG. 3, the supplied signal is coupled to the picture tube 15 through a network 50 through which the picture tube beam current is arranged to flow. Network 50 includes a capacitor 51 connected in parallel across a resistor 52 of relatively high impedance. By eliminating the resistor between the picture tube cathode and ground, the D.-C. component, as well as tht A.-C. components of the supplied signal is coupled unattenuated to the cathode of picture tube 15.

It would again be instructive to consider first the operation of control apparatus 314 for the case where the invention is not operative. Thus, FIG. 4*a* of the drawings represents the video signal output of amplifier 13 for two different signal conditions. Specifically, waveform E, having a D.-C. component F, represents a medium average brightness scene, whereas waveform G, having a D.-C. component H, represents a high average brightness scene. For the sake of clarity the waveform representing a low average brightness scene has been purposely omitted.

Application of these signals through network 50 to the cathode of picture tube 15 causes picture tube beam current to flow, the direction of flow being such as to make the potential of the cathode of tube 15 positive ith respect to the plate potential of video amplifier 13, ıd by an amount equal to the voltage drop across re-stor 52. Therefore, when beam current flows of an nount corresponding to a high average brightness scene, e D.-C. component H′ of the translated signal G′ be-omes positive with respect to the D.-C. component H : the supplied signal G. Similarly, when beam current ɔws of an amount corresponding to a medium average ːightness scene, the D.-C. component F′ of the trans-ted signal E′ becomes positive with respect to the D.-C. ɔmponent F of the supplied signal E. Furthermore, since ɩe amount of beam current flowing increases with in-ːeases in the average brightness value of the transmitted ːene, the D.-C. component increase from H to H′ is reater than the D.-C. component increase from F to F′. ıs a result, undesired blanking level variations once again ppear on the picture tube side of the coupling network 0. This is more readily observable from the waveforms f FIG. 4*b*.

Figure 4:
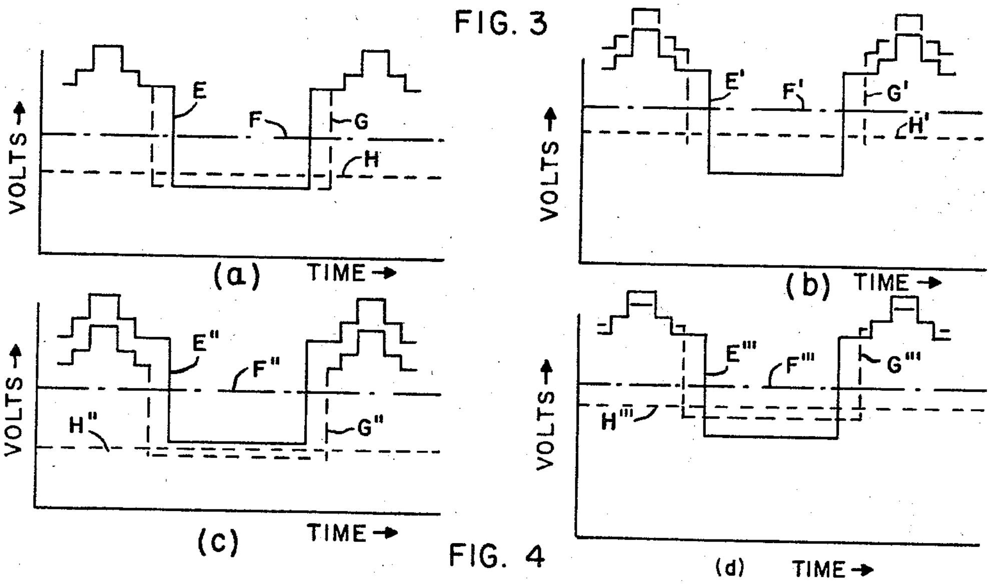

Just as in the control apparatus of FIG. 1, AGC cir-uit 27 detects these variations and employs them to vary he video gain to limit the beam current in picture tube 5 on scenes of high average brightness to prevent over-ɔad and to stabilize black in the reproduced image. As he average brightness value of the transmitted scene in-reases, the increasing positive voltage at the cathode of ıicture tube 15 causes AGC tube 29 to develop more ⅄GC voltage. This increase in AGC voltage is coupled o the control grids of the vacuum tubes in the amplifier tages of unit 11 to increase the bias thereon in the afore-nentioned manner. As a result, the magnitude of the upplied video signal is reduced, as is the beam current n tube 15. In this manner, the possible high voltage ɔower supply overload associated with high average ɔrightness scenes is minimized. In addition, the AGC cir-ːuit action is such that blanking level variations at the ːathode of picture tube 15 are eliminated so that black s once again stabilized in the reproduced image on all ;cenes. Waveforms E″ and G″ in FIG. 4*c* represent video ;ignals of medium and high average brightness, respec-ːively, developed by amplifier 13 with the invention oper-ıtive. Waveforms E‴ and G‴ in FIG. 4*d* represent these ;ame waveforms as they appear at the cathode of the ɔicture tube 15.

Figure 5:
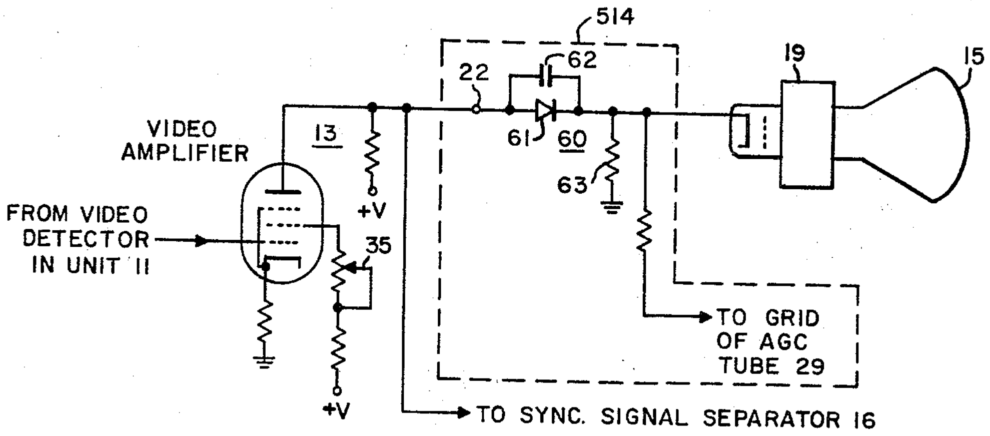
FIG. 5 illustrates another form of apparatus in accordance with the invention.

*Picture control apparatus 514 of FIG. 5*

The idea is presented in application Ser. No. 215,964, filed Aug. 9, 1962, and entitled "Black Level Stabilization System for a Television Receiver," which issued May 3, 1966, as Patent No. 3,249,694, that the real need in black level circuits is to provide faithful image reproduction on low and medium average brightness scenes, while, at the same time, providing protection against overload on high average brightness scenes. While overload protection is essential on high average brightness scenes, black level performance is not. In this respect, a unique coupling network is proposed in the above-mentioned application No. 215,964, which is connected between the video amplifier and the picture tube and which provides perfect D.-C. performance for scenes of low and medium average brightness and the equivalent of A.-C. coupling for scenes of high average brightness. However, by combining the D.-C./A.-C. coupling network with an arrangement capable of reducing video gain on high average brightness scenes, it is possible to preserve black level performance on all scenes, including the high average brightness scene, while still providing overload protection where necessary. Such an arrangement will now be described in connection with the control apparatus 514 of FIG. 5.

Thus, in FIG. 5 there is shown another form of picture control apparatus 514 also quite similar to the picture control apparatus 14 of FIG. 1, but one in which the supplied video signal is coupled to the picture tube 15 through a nonlinear control network 60, incorporating the above described D.-C./A.-C. concept. Network 60 includes a first path including a diode 61, adapted to couple the D.-C. component of the video signal on scenes of low and medium average brightness value, and a second path including capacitor 62, connected in parallel across diode 61, adapted to couple the A.-C. components thereof on video signals of high average brightness value. Picture tube beam current is arranged to flow in an external path through resistor 63 to ground in the same manner as FIG. 1. The point at which the transition from D.-C. coupling to A.-C. coupling occurs is determined by the voltage developed across resistor 63 by the picture tube beam current flowing through it.

The circuit of FIG. 5 operates in the following manner. Since network 60 acts as a D.-C. coupling network on scenes of low and medium-high average brightness, black level does not vary as a function of scene content at the picture tube side of network 60, and therefore AGC circuit 27 does not produce any corrective action other than normal automatic-gain-control. However, on scenes of high average brightness, since network 60 acts as an A.-C. coupling network, black level variations then occur at the cathode of picture tube 15. These are detected by AGC circuit 27 to reduce the video signal gain of the receiver to maintain black level constant and prevent power supply overload in the manner previously described for the circuit of FIG. 1. The embodiment herein described differs from the previous two embodiments principally in that the video gain is varied only on high average brightness scenes and not over the entire range of scene brightnesses.

Figure 6:
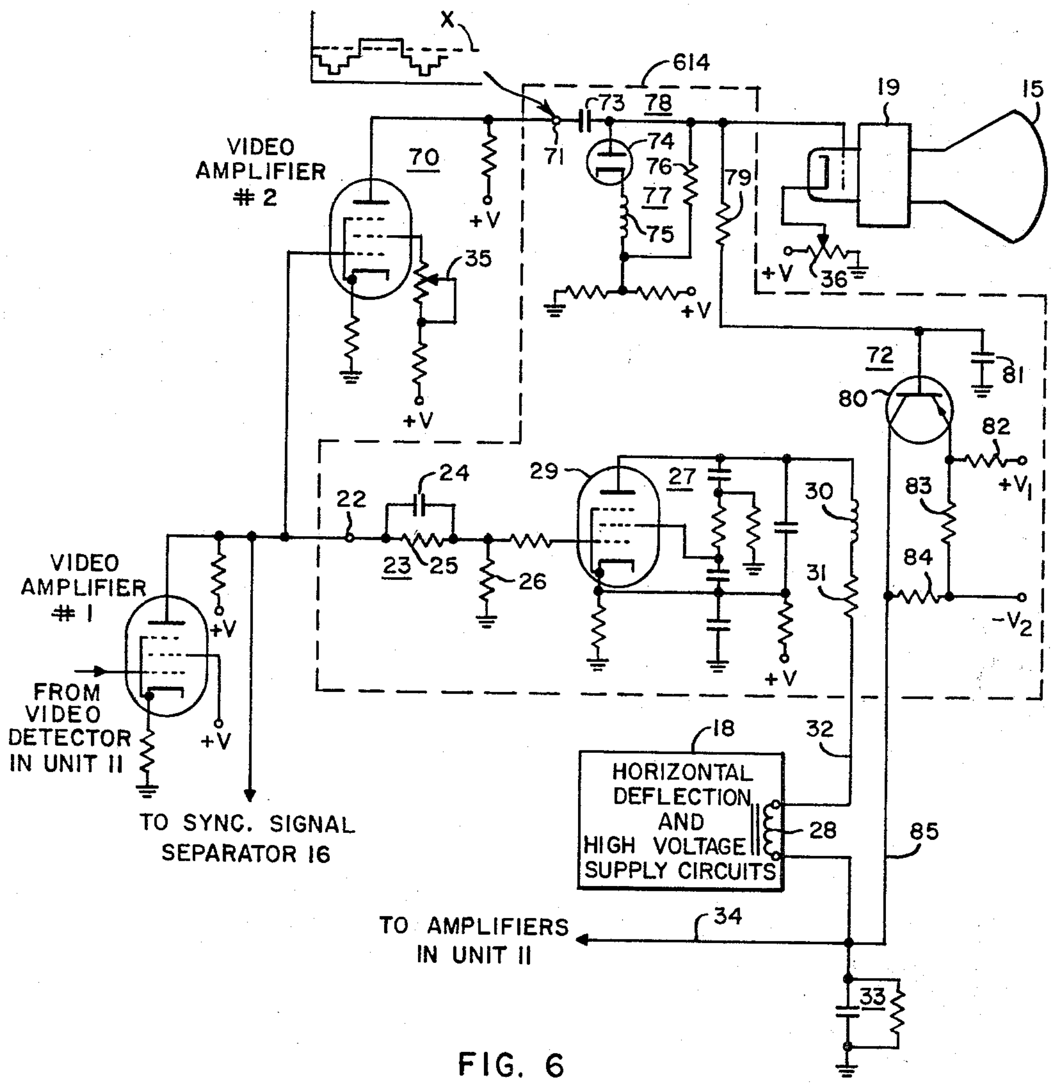
FIG. 6 illustrates a further form of apparatus in accordance with the invention.

*Picture control apparatus 614 of FIG. 6*

The foregoing three embodiments are applicable in a television receiver in which the picture tube is cathode driven. An embodiment will now be described for use in a receiver in which the picture tube is grid driven.

Thus, referring to FIG. 6, there is shown a partial schematic diagram of the television receiver of FIG. 1 in which the video signal is supplied by the same antenna system 10, unit 11 and video amplifier 13, with the addition, however, of a second stage of video amplification, represented by amplifier 70, to invert the video signal developed at terminal 22 by amplifier 13 so that it will be of correct polarity to grid drive the picture tube 15. Such an inverted signal may be shown by the waveform above terminal 71 where X represents the D.-C. component of the signal. In this regard it is to be understood that the video signal supply means is represented by terminal 71 instead of by terminal 22 as in FIGS. 1, 3, or 5. Associated with the addition of a second stage of amplification is the transfer of the contrast control 35 from the screen grid circuit of amplifier 13 to the screen grid circuit of amplifier 70.

The embodiment of FIG. 6 also differs from any of the preceding embodiments in that the control signal used to reduce the video signal gain as scene brightness increases is derived not only from the AGC circuit 27, as previously described, but from a transistor amplifier circuit 72 as well. This will be more fully understood from a description of the operation of the apparatus of FIG. 6. It is to be noted in passing, however, that AGC circuit 27 does not operate to stabilize black in the reproduced image but only provides protection against power supply overload. This follows since, although AGC circuit 27 stabilizes the blanking level at the output side of network 23, terminal 22 being its input side, the output side is not connected to the picture tube 15, as in the preceding embodiments.

Since the manner in which AGC circuit 27 operates on the video signal translated through coupling network 23 to derive a signal representative of the average brightness value of the transmitted scene has already been described with reference to the control apparatus 14 of FIG. 1, it will not be repeated here. Instead, the operation of the control apparatus 614 of FIG. 6 will be described with reference to the transistor amplifier circuit 72 which also develops a signal representative of the variations in scene brightness. This signal supplements that derived by the AGC circuit 27 to vary the video signal gain in a manner to limit the beam current flowing in picture tube 15 to prevent power supply overload on scenes of high average brightness value.

In operation, the A.-C. components of the video signal supplied to terminal 71 with sync pulses extending in a negative direction, are coupled through capacitor 73 to the control grid of picture tube 15 but capacitor 73 prevents the translation of the D.-C. or average brightness component thereto. Diode 74, winding 75 and resistor 76, however, comprise a D.-C. restorer circuit 77 for re-establishing the D.-C. component. Diode 74 is keyed to operate by flyback pulses derived from transformer 28 of the horizontal sweep output circuit of unit 18, delayed by a network (not shown), and supplied through winding 75 to the cathode of diode 74 so that the D.-C. restoration function is performed on the blanking level which follows the synchronizing pulses. In this manner, the blanking level is stabilized at the anode of diode 74 and the black level is stabilized in the reproduced image. Such a D.-C. restorer circuit is similar to one more fully described in my patent, No. 2,913,522, entitled "Automatic Control Systems for Television Receivers," issued November 17, 1959, which was subsequently surrendered for Reissue Patent No. 25,284 which issued on Nov. 6, 1962. Capacitor 73 and D.-C. restorer circuit 77 may be considered to constitute a network 78 for coupling the supplied video signal at terminal 71 to the control grid of picture tube 15. It is to be noted at this point, that since amplifier 70 is A.-C. coupled to the D.-C. restorer circuit 77 and to the grid of picture tube 15, AGC circuit 27, represented in FIG. 6 as of the back porch keyed variety, might just as easily have been represented as of the more conventional sync peak keyed variety.

Besides being applied to the control grid of picture tube 15, the D.-C. restored signal developed at the anode of diode 74 is coupled through resistor 79 to the base of transistor 80, connected in a common emitter configuration. The A.-C. components of this signal are bypassed to ground through filter capacitor 81 so that transistor 80 derives a signal indicative only of the D.-C. component and its variations. Resistors 82 and 83 and voltage supplies $+V_1$ and $-V_2$ establish the necessary bias for transistor 80, supply $-V_2$ also serving as the collector return voltage.

As the average brightness value of the transmitted scene increases, the D.-C. component at the base of transistor 80 also increases, causing the D.-C. current flowing through collector-load resistor 84 to decrease. As a result, the voltage at the collector of transistor 80 becomes more negative. This decrease in voltage is coupled through wire 85 to the signal magnitude control means located in the amplifier stages of unit 11, as described with reference to the receiver of FIG. 1, wherein it supplements the control signal derived by AGC circuit 27 to reduce the magnitude of the supplied video signal. In this manner the D.-C. component, as well as the A.-C. components of the video signal developed at input terminal 71 are decreased, thereby lowering the beam current in picture tube 15 and preventing high voltage power supply overload on scenes of high average brightness. Conversely, a decrease in scene average brightness will produce a decrease in the D.-C. component at the base of transistor 80, an increase in collector current, a decrease in the negative voltage at the collector of transistor 80, and an increase in the magnitude of the supplied video signal. Here too, as in the previous three embodiments, it is apparent that the direction in which the video signal magnitude is varied is opposite to the direction in which scene brightness varies.

As was prevously mentioned with reference to the apparatus shown in FIG. 1, the amount by which the video signal gain is varied as scene brightness changes is dependent upon the average brightness value of the transmitted scene and upon the blanking level variations at the control grid of the AGC keyer 29. This is also true for the apparatus shown in FIGS. 3, 5 and 6. However, whereas the apparatus shown in FIGS. 1 and 6 provide a voltage operative video gain control effect, i.e., one which is independent of picture tube beam current, the apparatus shown in FIGS. 3 and 5 provide a current operative video gain control effect.

Each of those forms of apparatus are intended for use in a negative modulation television system. In such a system, and for the receiver of FIG. 1, the signal developed at the output of video amplifier 13, neglecting the residual D.-C. or offset voltage at the plate of amplifier 13, has the general waveform depicted in FIG. 7, where $E$=the peak amplitude of the synchronizing pulse with respect to the zero base line, $m_b$=the fractional modulation corresponding to the video signal blanking level, $m_s$=the fractional modulation of the synchronizing pulse peaks with respect to the blanking level, and where $m_v$=the fractional modulation of the peak white level with respect to the blanking level. With such notation, it is possible to derive an expression relating the amount of video signal reduction or turn down to scene brightness and to the blanking level variations at the AGC tube 29 for the voltage operative case. To wit, as exemplified by the apparatus of FIG. 1, the amount by which the magnitude of the supplied video signal is reduced as the transmitted scene increases in average brightness from one representing an all black scene to one of higher average brightness is given by the expression:

$$\frac{E\alpha=0}{E\alpha=\alpha}=1+\beta\alpha \qquad (1)$$

where $\beta$ is given by the expression:

$$\beta=\frac{(K_{ac}-K_{dc})m_v dv}{K_{dc}(m_b+m_s ds)-K_{ac}m_s ds} \qquad (2)$$

where $\alpha$=a variable representative of the average brightness value of the transmitted scene having a value between 0 and 1 such that $\alpha=0$ corresponds to an all black scene and $\alpha=1$ corresponds to an all white scene, where $E\alpha=0$=the peak amplitude of the synchronizing pulse with respect to the zero base line for an all black scene, i.e., where $\alpha=0$, and where $E\alpha=\alpha$=the peak amplitude of the synchronizing pulse with respect to the zero base line for a scene of intermediate brightness In this regard:

$K_{ac}$=the A.-C. transmission gain from terminal 22 to the control grid of AGC tube 29, $K_{dc}$=the D.-C. transmission gain from terminal 22 to the control grid of AGC tube 29, $dv$=the duty cycle of the picture representative portion of the video signal, $ds$=the duty cycle of the synchronizing pulse portion of the video signal and E, $m_b$, $m_s$ and $m_v$ are as previously defined.

For example, if as in the negative modulation television system used in the United States, $m_s=0.25$, $m_v=0.625$, $m_b=0.75$, $ds=0.09$, and $dv=0.77$ then $$\frac{E\alpha=0}{E\alpha=\alpha}=1+\frac{0.481\left(\frac{K_{ac}}{K_{dc}}-1\right)\alpha}{0.7725-0.0225\frac{K_{ac}}{K_{dc}}} \qquad (3)$$

It is seen from Equation 3 that the amount of video turn down is, as was previously mentioned, a function of the average brightness value of the transmitted scene ($\alpha$) and of the relative coupling of the A.-C. and D.-C. components of the video signal from input terminal 22 to the AGC circuit 27, the latter determining the amount of blanking level variations at the grid of the AGC tube 29. If $K_{ac}/K_{dc}$ is chosen to equal 2.5, then the magnitude of he video signal developed by amplifier 13, measured between the peak of the synchronizing pulse and the zero base line, would be reduced by approximately one-half as the transmitted scene changes from all black ($\alpha=0$) to all white ($\alpha=1$).

It is also possible to derive an expression for the amount of video gain reduction for the current operative case as exemplified by the apparatus of FIGS. 3 and 5. To wit, $$\frac{E\alpha=0}{E\alpha=\alpha}=\frac{E_R-E_0}{E_R-E_0-[I_{av}R]_\alpha} \qquad (4)$$

where $E_0$=the D.-C. offset or residual voltage at the plate of amplifier 13 with zero input signal;

$E_R$=the voltage corresponding to the video signal level stabilized by the AGC circuit 27, in this case the blanking level;

$I_{av}$=the average value of picture tube beam current flowing on a scene of given average brightness ($\alpha$), and $R$=the equivalent resistance through which $I_{av}$ flows.

In accordance with one teaching of the present invention, a sync peak keyed AGC circuit could be used to provide overload protection instead of the back porch keyed AGC circuit shown in FIGS. 1, 3, 5, and 7. Such an AGC circuit will stabilize the sync tips at the picture tube 15 but will allow the blanking level to vary as scene content changes. The result will be that black will not be correctly reproduced in the image for all scenes. With a sync peak keyed AGC circuit in the television receiver of FIG. 1, the amount of video turn down to prevent overload as scene brightness increases from an all black scene ($\alpha=0$) is still given by the Expression 1, namely $$\frac{E\alpha=0}{E\alpha=\alpha}=1+\beta\alpha$$

but where $\beta$ is now given by the Expression $$\beta=\frac{\left(\frac{K_{ac}}{K_{dc}}-1\right)m_v dv}{(m_b+m_s ds)+\frac{K_{ac}}{K_{dc}}(1-m_b-m_s ds)} \qquad (5)$$

If the same values for $m_b$, $m_s$, $m_v$, $ds$ and $dv$ are chosen as previously, then $$\frac{E\alpha=0}{E\alpha=\alpha}=1+\frac{0.481\left(\frac{K_{ac}}{K_{dc}}-1\right)\alpha}{0.7725+0.2275\frac{K_{ac}}{K_{dc}}} \qquad (6)$$

In order for the amount of signal reduction to equal one-half as the transmitted scene changes in average brightness from all black ($\alpha=0$) to all white ($\alpha=1$) the sync peak AGC circuit would require an A.-C./D.-C. transmission ratio $K_{ac}/K_{dc}$, of approximately 5.0. Thus, for the same amount of video turn down as the transmitted scene changes from an all black scene to an all white scene, a sync peak keyed AGC arrangement requires approximately twice as much A.-C. transmission as D.-C. transmission from input terminal 22 to the AGC tube 29 as does a back porch keyed AGC arrangement.

On the other hand, if the sync peak keyed AGC circuit were employed in the apparatus of FIGS. 3 or 5, each of which provide a current operative video turn down effect, the percentage signal reduction is given by the expression $$\frac{E\alpha=0}{E\alpha=\alpha}=\frac{E_R-E0}{E_R-E0-[I_{av}R]_\alpha} \qquad (4)$$

which is identical in form to that expression for a back porch keyed AGC circuit. However, it is to be noted that in the sync peak keyed AGC arrangement, $E_R$ does not equal the voltage corresponding to the video signal blanking level but the voltage corresponding to the level to which the synchronizing pulses extend.

Figure 8:
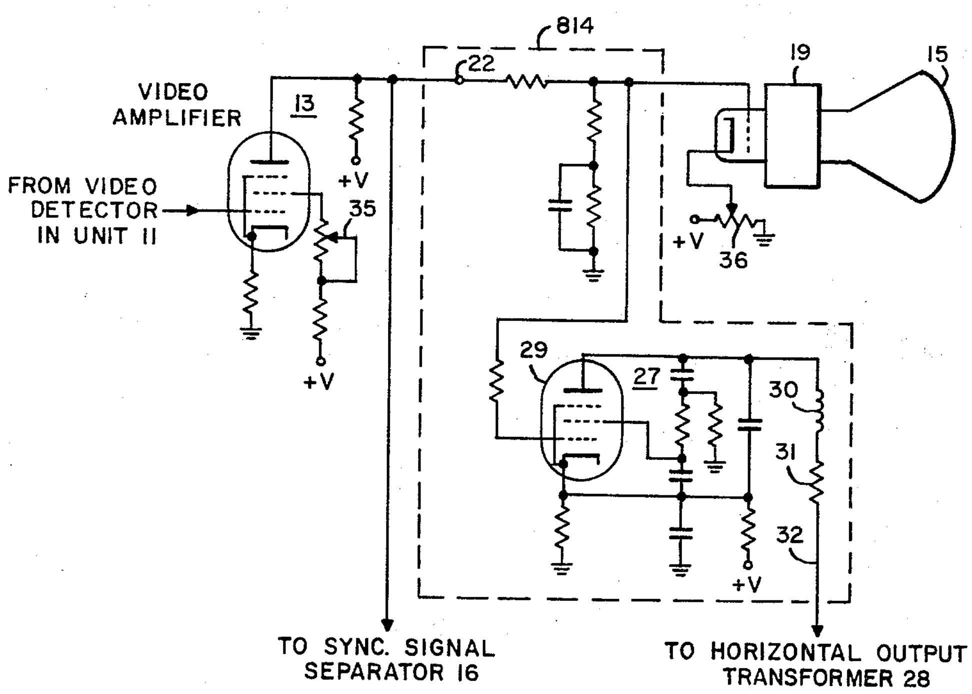
FIG. 8 illustrates an additional form of apparatus in accordance with the invention.

*Picture control apparatus 814 of FIG. 8*

Figure 7:
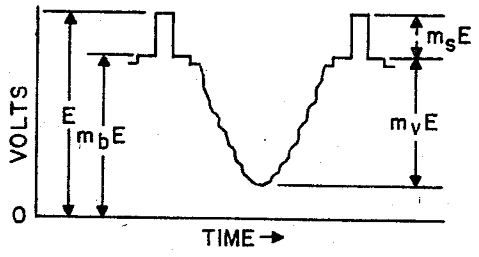
FIG. 7 is a signal diagram useful in explaining one of the features of the invention with reference to the foregoing forms of apparatus constructed in accordance with the invention.
Figure 9:
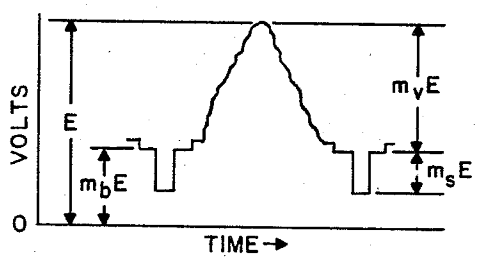
FIG. 9 is a signal diagram useful in explaining a feature of the invention with reference to the form of apparatus of FIG. 8.

All of the foregoing embodiments are intended for use in a negative modulation system as employed in the United States. However, the teachings of the present invention are also applicable in a positive modulation system in which the video signal developed at the output of the video amplifier 13 has the general waveform shown in FIG. 9, neglecting the residual D.-C. or offset voltage at the plate of amplifier 13, and where the notations and corresponding definitions associated with the waveform of FIG. 7 are also applicable to the waveform of FIG. 9. Thus, there is shown in FIG. 8 a partial schematic diagram of a television receiver similar to that of FIG. 1, the only differences between the two being the manner in which the signal developed by video amplifier 13 is applied to picture tube 15 and the manner in which amplifier 13 is coupled to the AGC tube 29. In FIG. 1, the video signal developed by amplifier 13 is applied to the cathode of picture tube 15 while in FIG. 8 it is applied to the control grid. Secondly, in the negative modulation television system of FIG. 1, there is a greater percentage of A.-C. transmission to the AGC tube 29 than D.-C. transmission, while in the positive modulation television system of FIG. 8, there is a greater percentage of D.-C. transmission to the AGC tube 29 than A.-C. transmission. Black level stabilization and overload protection on high brightness scenes are provided in a manner similar to that described with reference to the control apparatus 14 of FIG. 1.

In FIG. 8, the amount by which the magnitude of the supplied video signal is reduced as the transmitted scene increases in average scene brightness from one representing an all black scene to one of higher brightness is given by the same expression 1 as above, namely:

$$\frac{E\alpha=0}{E\alpha=\alpha}=1+\beta\alpha \qquad (1)$$

but where $\beta$ is now given by the expression $$\beta=\frac{\left(1-\frac{K_{ac}}{K_{dc}}\right)m_v dv}{(m_b-m_s ds+\frac{K_{ac}}{K_{dc}}m_s ds} \qquad (7)$$

If, as in the positive modulation television system employed in Great Britain $m_s$=0.27, $m_v$=0.70, $m_b$=0.30, $ds$=0.10, and $dv$=0.76, then $$\frac{E\alpha=0}{E\alpha=\alpha}=1+\frac{0.532\left(1-\frac{K_{ac}}{K_{dc}}\right)\alpha}{0.273+0.027\frac{K_{ac}}{K_{dc}}} \qquad (8)$$

Thus, here too, it is seen that the amount of video turn down is a function of the average brightness of the transmitted scene ($\alpha$) and of the relative coupling of the A.-C. and D.-C. components of the video signal from terminal 22 to the AGC tube 29. In order for the amount of signal reduction to equal one half as the transmitted scene changes in average brightness from an all black scene ($\alpha=0$) to an all white scene ($\alpha=1$), the A.-C./D.-C. transmission ratio required from terminal 22 to the AGC tube 29, $K_{ac}/K_{dc}$, would be approximately 0.5. Thus for the voltage operative control apparatus of FIGS. 1 and 8 to provide the same degree of overload protection and black level stabilization, requires, in the first case, an A.-C./D.-C. transmission ratio of approximately 2.5, while in the second case, an A.-C./D.-C. transmission ratio of approximately 0.5.

On the other hand, if the current operative control apparatus of FIGS. 3 or 5 are used in a positive modulation system instead of in a negative modulation system, the expression relating to the percentage of video turn down as a function of scene brightness would not change in form but would remain as given by Equation 4, namely $$\frac{E\alpha=0}{E\alpha=\alpha}=\frac{E_R-E_0}{E_R-E_0-[I_{av}R]_\alpha}$$

However, it is to be understood that in applying this expression consideration must be taken of the fact that $E_0$, the video signal blanking level, and the video signal sync peak level are not the same in both systems.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a television receiver having a cathode-ray tube and an energy supply connected thereto for purposes of image reproduction, picture control apparatus comprising:

means for supplying a video signal having a blanking level which may vary with changes in received signal intensity, having a D.-C. component representative of average scene brightness which may vary from scene to scene, said supply means including control means for varying the magnitude of the video signal; means for translating the supplied video signal to an input of said cathode-ray tube, wherein said translation causes the blanking level of said translated video signal to undesirably vary at said input with changes in average scene brightness, in addition to varying with changes in received signal intensity;

a keyed automatic-gain-control circuit coupled to the input of said cathode-ray tube and responsive to the blanking level of said translated video signal for developing an output signal jointly representative of variations in received signal intensity and of variations in average scene brightness;

and means for coupling said output signal to the control means for varying the magnitude of the supplied video signal to limit the amount of beam current flowing in said cathode-ray tube on scenes of high average brightness and to stabilize blanking level at the input of said cathode-ray tube, thereby maintaining black level constant in the reproduced image.

2. Picture control apparatus in accordance with claim 1 in which said signal translating means includes a first path including a diode adapted to couple the D.-C. component of the supplied video signal on scenes of low and medium average brightness value and a second path including a capacitor connected in parallel across the diode adapted to couple the A.-C. components thereof, the network further including a resistance through which picture tube beam current is arranged to flow.

3. Picture control apparatus in accordance with claim 1 in which the magnitude of the supplied video signal is varied as an inverse function of variations in average scene brightness to limit the amount of beam current flowing in the cathode-ray tube on scenes of high average brightness.

4. Picture control apparatus in accordance with claim 1 in which the supplied video signal includes the A.-C. and D.-C. components thereof, and in which said signal translating means includes a first signal coupling path for coupling the A.-C. components of the supplied video signal to the input of said cathode-ray tube and a second signal coupling path for coupling a portion of the D.-C. component to the input of said cathode-ray tube, thereby causing the blanking level of said translated video signal to vary in accordance with changes in average scene brightness.

5. Picture control apparatus in accordance with claim 4 in which said signal translating means includes a capacitor and in which the second path includes a resistance divider circuit.

6. Picture control apparatus in accordance with claim 1 in which the supplied video signal includes the A.-C. and D.-C. components thereof, and in which said signal translating means is coupled to the cathode of said cathode-ray tube, and translates beam current from said cathode-ray tube to said signal supply means, as a result of which blanking level in said translated video signal is caused to vary in accordance with variations in average scene brightness.

7. Picture control apparatus in accordance with claim 6 in which the signal translating means comprises the parallel combination of a resistance and a capacitance connected between said video signal supply means and the cathode of said cathode-ray tube.

References Cited

UNITED STATES PATENTS

| | | | |
|---|---|---|---|
| 2,743,313 | 4/1956 | Schwarz | 178—7.5 |
| 2,892,028 | 6/1959 | Pritchard et al. | 178—7.3 |
| 2,927,155 | 3/1960 | Godier | 178—7.3 |

OTHER REFERENCES

Fink, Television Engineering Handbook pages 15–10, 15–11, 15–12 McGraw-Hill, 1957.

DAVID G. REDINBAUGH, *Primary Examiner.*

R. L. RICHARDSON, *Assistant Examiner.*